United States Patent [19]
Dahlgren et al.

[11] Patent Number: 5,754,791
[45] Date of Patent: May 19, 1998

[54] HIERARCHICAL ADDRESS TRANSLATION SYSTEM FOR A NETWORK SWITCH

[75] Inventors: Kent Blair Dahlgren, San Jose, Calif.; Daniel J. Bedell, Portland, Oreg.

[73] Assignee: I-Cube, Inc., Campbell, Calif.

[21] Appl. No.: 622,764

[22] Filed: Mar. 25, 1996

[51] Int. Cl.$^6$ .................................................. G06F 15/163
[52] U.S. Cl. ........................... 395/200.72; 395/200.73; 395/200.68; 370/400
[58] Field of Search .................................. 370/400–402; 395/200.15, 200.68–200.74

[56] References Cited

U.S. PATENT DOCUMENTS

| | | | |
|---|---|---|---|
| 4,814,762 | 3/1989 | Franaszek . | |
| 4,947,388 | 8/1990 | Kuwahara et al. . | |
| 5,274,631 | 12/1993 | Bhardwaj | 370/401 |
| 5,412,648 | 5/1995 | Fan . | |
| 5,420,858 | 5/1995 | Marshall et al. | 370/352 |
| 5,425,026 | 6/1995 | Mori | 370/410 |
| 5,428,800 | 6/1995 | Hsieh et al. . | |
| 5,430,442 | 7/1995 | Kaiser et al. . | |
| 5,434,914 | 7/1995 | Fraser | 379/219 |
| 5,515,376 | 5/1996 | Murthy et al. | 370/402 |
| 5,588,119 | 12/1996 | Vincent et al. | 395/200.53 |
| 5,590,201 | 12/1996 | Lo | 380/49 |
| 5,617,421 | 4/1997 | Chin et al. | 370/402 |
| 5,617,547 | 4/1997 | Feeney et al. | 395/311 |
| 5,659,718 | 8/1997 | Osman et al. | 395/551 |

OTHER PUBLICATIONS

Yuval Tamir and Hsin–Chou Chi, *IEEE Transactions on Parallel and Distributed Systems*, vol. 4, No. 1, 1993, "Symmetric Crossbar Arbiters for VLSI Communication Switches," pp. 13–27.

*Primary Examiner*—William M. Treat
*Attorney, Agent, or Firm*—Smith-Hill and Bedell

[57] ABSTRACT

A network switch routes data transmissions between uniquely addressed network stations connected to input and output ports of the switch. The switch includes a hierarchical address translation system for relating network addresses of stations to receive incoming transmission to the switch ports to which they are connected. The translation system includes a central translation unit having a memory for storing a mapping entry for each network station, the entry mapping the station's network address to its switch port. The system also includes a local translation unit in each input port. Each local translation unit contains a local cache memory for storing a smaller subset of the mapping entries stored by the central translation unit. When a data transmission arrives at an input port directed to a network address, the input port looks for an entry in its cache memory mapping that network address to an output port. Upon finding such an entry in its cache memory, the input port directs the incoming data transmission to that output port. When not finding such an entry in its cache memory, the input port obtains a copy of the appropriate mapping entry from the central translation unit, stores it as a new mapping entry in its cache memory and then directs the data transmission the output port identified by the new mapping entry.

7 Claims, 8 Drawing Sheets

HIERARCHICAL ADDRESS TRANSLATION SYSTEM FOR A NETWORK SWITCH

BACKGROUND OF THE INVENTION

1. Field of the Invention

The present invention relates to a switch for routing data transmissions between stations of a network, and in particular to a network switch having a hierarchical address translation system for mapping each network station's address to a switch port servicing the station.

2. Description of Related Art

Computer networks transfer data between computers or other types of network stations. For example 10BASE-T Ethernet systems use sets of twisted pair conductors in a star network topology to connect network stations to a central hub. A 10BASE-T hub is simply a repeater receiving a data packet from any one station and concurrently rebroadcasting it to all other stations. A header in the data packet indicates the intended destination station for the packet and each network station looks at the packet header to determine if it should the accept or ignore an incoming packet. However in a network interconnected through a network hub a transmission from any one station blocks transmissions from all other stations. Thus only one network station can transmit a packet at any given time. Also every network station must examine every packet transmitted on the network even though much of the traffic may be directed to other stations.

A network switch, unlike a network hub, may route a data packets only to destination stations connected to particular switch ports so that each network station may receive only the packet traffic directed to it. A network switch includes a switching mechanism such as a crosspoint switch for selectively routing each incoming packet from an input port to an appropriate output port. The input port determines the destination output port from the routing data included in the packet header and then requests a connection between the input port and the destination output port. When the connection is established, the input port sends the packet to the output port via the crosspoint switch.

A packet arriving at a switch port contains the network address of the station to which it is directed and the switch must relate that station's address to the switch output port to which the station is connected before the packet can be forwarded. The process of relating a network address of a destination station to the switch port is problematic. In a typical prior art system, as illustrated in U.S. Pat. No. 5,412,648 issued May 2, 1995 to Ruixue Fan, each input port stores an incoming packet, extracts the destination address from the packet's header and then forwards it to a central address translation unit. The address translation unit, which maintains a look-up table relating network addresses to switch output ports, returns the output port identification (ID) to the input port. The input port then requests a connection through the switch to the indicated output port and forwards the packet to that output port. Each input port must compete with other input ports for access to the central address translation unit and as packet traffic increases so too do delays in obtaining address translations.

What is needed is a network switch in which input ports can rapidly translate network address into port IDs with minimal delay due to competition for central address translation services.

SUMMARY OF THE INVENTION

A network switch in accordance with the present invention routes data transmissions between uniquely addressed network stations connected to input and output ports of the switch. The switch includes a hierarchical address translation system for relating network addresses of stations to receive incoming transmission to the switch ports to which they are connected. The translation system includes a central translation unit having a memory for storing a mapping entry for each network station, the entry mapping the station's network address to its switch port. The system also includes a local translation unit in each input port. Each local translation unit contains a local cache memory for storing a smaller subset of the mapping entries stored by the central translation unit. When a data transmission arrives at an input port directed to a network address, the input port looks for an entry in its cache memory mapping that network address to an output port. Upon finding such an entry in its cache memory, the input port directs the incoming data transmission to that output port. When not finding such an entry in its cache memory, the input port obtains a copy of the appropriate mapping entry from the central translation unit, stores it as a new mapping entry in its cache memory and then directs the data transmission the output port identified by the new mapping entry. The new mapping entry replaces a least recently used existing entry.

Since a network station is typically more likely to send a next data transmission to one of the network stations to which it most recently transmitted data, the local translation unit in each input port significantly reduces competition for access to the central address translation unit and therefor improves system throughput, particularly during times of heavy network traffic.

It is accordingly an object of the present invention to provide a network switch for quickly routing data transmissions between network stations with minimal address translation delay.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
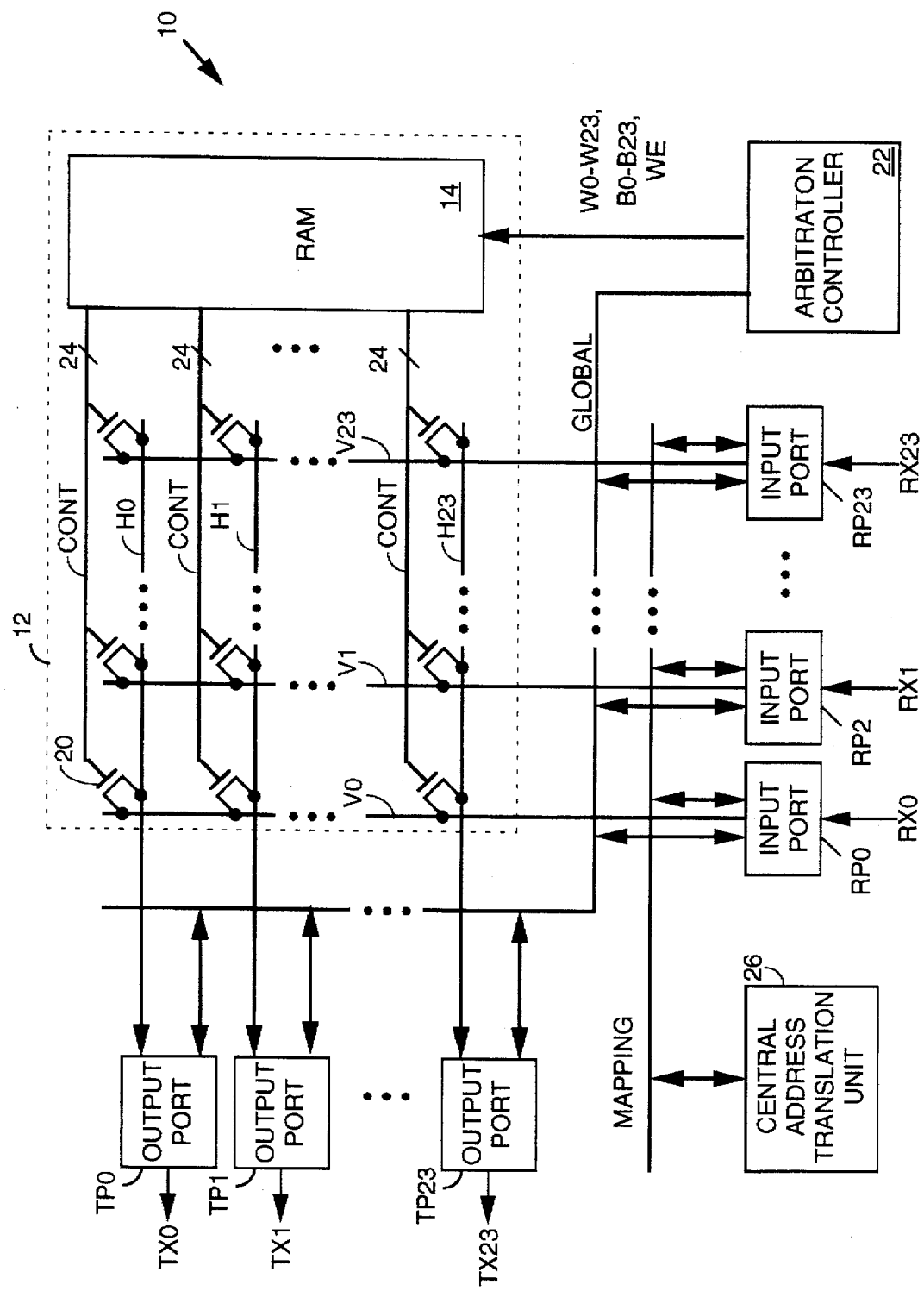
FIG. 1 illustrates a local area network switch in accordance with the present invention for routing serial data packets between up to 24 network stations.

FIG. 1 illustrates a local area network (LAN) switch 10 in accordance with the present invention for routing data transmissions between a set of network stations (not shown). Network switch 10 includes a set of input ports RP0–RP23, each receiving incoming packets arriving from one or more network stations on a corresponding one of input buses RX0–RX23. Network switch 10 also includes a set of output ports TP0–TP23, each forwarding data packets outward on a corresponding one of output buses TX0–TX23 to one or more network stations. Each input port RP0–RP23 is connected to a crosspoint switch 12 via a corresponding one of switch input lines V0–V23 and each output port is connected to switch 12 via a corresponding one of switch output lines H0–H23. Switch 12 routes each data packet arriving from an input port via one of input lines V0–V23 to the appropriate output port via one of switch output lines H0–H23.

Packet Routing

A data packet arriving at any input port RP0–RP23 via one of input buses RX0–RX23 includes network address of the destination network station to receive the packet. When a packet arrives at one of input ports RP0–RP23 the input port stores the packet and reads the destination address from the packet. Using a hierarchical address translation system described herein below, the input port converts the destination address into the identification (ID) of the output port TP0–TP23 serving the destination station. The input port sends the output port ID to an arbitration controller 22 via a bus (GLOBAL) to request a connection through switch 12 to the output port. The arbitration controller 22 also communicates with the output ports via the GLOBAL bus to determine when each output port is idle, not currently receiving a data packet from any other input port via switch 12. When the requested output port becomes idle, the arbitration controller 22 establishes the requested connection through switch 12 and signals the requesting input port that it may begin transmitting the packet to the output port via switch 12. As the output port receives the data packet, it stores it in a buffer memory and later forwards the packet to the destination network station via one of output buses TX0–TX23.

Crosspoint Switch

Crosspoint switch 12 includes the set of 24 "vertical" input lines (conductors) V0–V23, each connected to a corresponding one of input ports RP0–RP23 and the set of 24 "horizontal" output lines H0–H23, each connected to a corresponding one of output ports TP0–TP23. An array of CMOS pass transistors 20 each have source and drain terminals connected to one of horizontal lines H0–H23 and to one of vertical lines V0–V23. A random access memory (RAM) 14 stores 24 24-bit words and supplies a separate control signal CONT to the gate of each transistor 20. When a CONT signal is asserted, it turns on a pass transistor 20, thereby establishing a signal path between one of vertical lines V0–V23 and one of horizontal lines H0–H23. The state of each CONT signal supplied to a transistor 20 of the Jth row of transistors 20 is determined by a corresponding bit of a Jth data word stored in RAM 14. The arbitration controller 22 grants connection requests from the input ports RP0–RP23 by writing data to RAM 14, thereby making an breaking signal routing paths through switch 12.

Input Port

Figure 2:
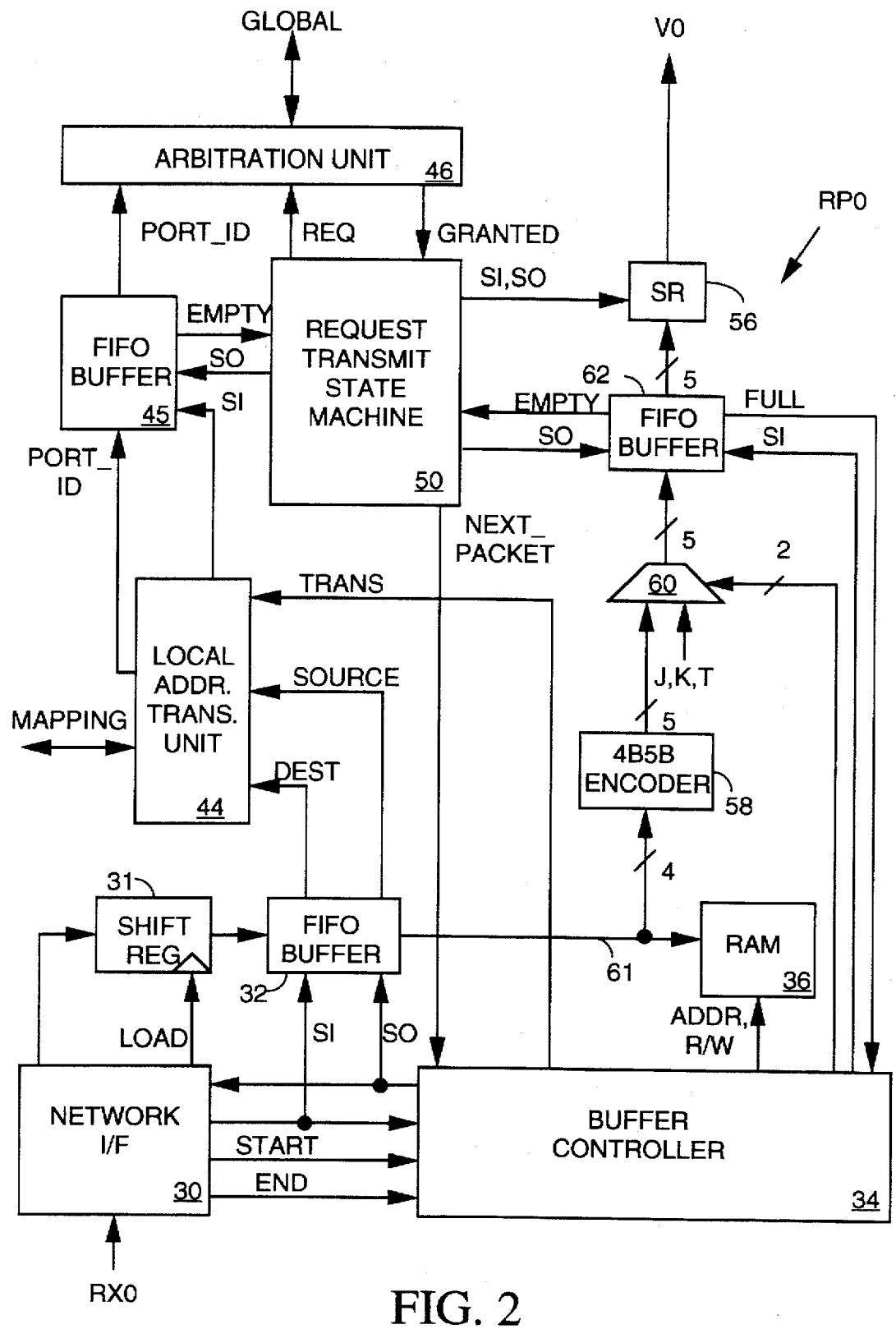
FIG. 2 illustrates a typical input port of FIG. 1 in more detailed block diagram form.

FIG. 2 illustrates input port RP0 of FIG. 2 in more detailed block diagram form. Input ports RP1–RP23 are similar. A network station transmits a data packet to input port RP0 in serial form via bus RX0 using Ethernet 10BASE-T protocol. The data packet, formatted as a standard Ethernet protocol data unit, is of variable length and includes the fields illustrated in Table I:

TABLE I

| Field | Field Length | Purpose |
| --- | --- | --- |
| PREAMBLE | 7 bytes | Used for synchronizing |
| START | 1 byte | Start of frame delimiter |
| DEST | 6 bytes | Destination Network address |
| SOURCE | 6 bytes | Source Network address |
| TYPE/LEN | 2 bytes | Type or length of data field |
| DATA | 46–1500 bytes | Data field |
| CRC | 4 bytes | Frame check field |

The PREAMBLE and START fields are fixed data patterns that are the same for all packets. The DEST field indicates the network address of the station to receive the packet or indicates the network address. The SOURCE field indicates the network address of the station that transmitted the packet. The TYPE/LEN fields may indicate either the packet type or the length of the DATA field, depending on the protocol being employed. The DATA field holds the packet payload data and may be from 46 to 1500 bytes long. The CRC field is a frame check field used by the receiving station to determine whether the packet has been corrupted in transmission.

Referring to FIG. 2, a convention 10BASE-T network interface circuit 30 receives the incoming packet arriving on input bus RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO buffer to store the nibble. Interface circuit 30 continues to load each successive nibble of the data packet into buffer 32.

When the longest stored nibble in FIFO buffer 32 is the first nibble of a data packet following the preamble, network interface circuit 30 transmits a START signal to a buffer controller 34. Buffer controller 34 controls the storage of data packets in a random access memory (RAM) 36. On receipt of the START signal, buffer controller 34 begins pulsing a shift-out signal (SO), each pulse causing FIFO buffer 32 to shift a 4-bit data nibble out to RAM 36 via a 4-bit data bus 61. RAM 36, controlled by address and read/write control signals generated by buffer controller 34, stores the packet data nibbles at sequential addresses. Network interface circuit 30 counts each packet nibble loaded into FIFO buffer 32 and also counts pulses of the SO signal produced by buffer controller 34 to determine how many nibbles of the controller 34 has stored in RAM 36. After interface circuit 30 shifts the last nibble of a packet into FIFO buffer 32, it continues to count the number of nibbles the buffer controller 34 shifts out of buffer 32 and sends an END signal to controller 34 to tell it that it has acquired the last nibble of the packet. Buffer controller 34 also counts nibbles of incoming packet data as they are stored in RAM 36. After receiving the END signal from network interface 30, controller 34 stores its count in RAM 36 as a LENGTH field in a header portion of the packet. When the packet is later forwarded to an output buffer, the output buffer determines the length of the packet from the LENGTH field.

As it loads packet data into RAM 36, buffer controller 34 determines from its nibble count when the data packet's source and destination fields (SOURCE, DEST) appear in FIFO buffer 32. At that point buffer controller 34 generates a translate signal (TRANS) pulse causing a local address translation unit 44 to acquire the SOURCE and DEST data. As described in more detail herein below, the local translation unit 44 converts the DEST field identifying the packet's destination station to a port ID of the output port to which the destination station is connected. Translation unit 44 then delivers the destination output port's ID (PORT_ID) to a FIFO buffer 45. Translation unit 44 uses the incoming SOURCE field to update entries mapping the network address identified by the SOURCE field to output port TP0.

The longest stored PORT_ID in FIFO buffer 45 is supplied to an arbitration unit 46. FIFO buffer 45 supplies an EMPTY signal to a request transmit state machine 50 when FIFO buffer 45 is empty and de-asserts the EMPTY signal when it stores a port ID. State machine 50 controls the flow of data outward from input port RP0 on conductor V0 to switch 12 of FIG. 1. When state machine 50 detects FIFO buffer 45 is not empty, and port TP0 is not currently forwarding a packet via line V0, state machine 50 pulses a request signal REQ supplied to arbitration unit 46. Arbitration unit 46 then acquires the longest stored PORT_ID output from FIFO buffer 45. Later, when arbitration controller 22 (FIG. 1) polls input port RP0 via the GLOBAL bus to determine if input port TP0 has a pending connection request, controller 22 acquires the PORT_ID from arbitration unit 46. When controller 22 thereafter grants the request, it signals arbitration unit circuit 46 (FIG. 2) to supply a GRANTED pulse to state machine 50. State machine 50 then pulses a NEXT_PACKET signal supplied to buffer controller 34 telling controller 34 it may begin forwarding another packet stored in RAM 36 outward on the V0 line.

To forward a packet from RAM 36, buffer controller 34 first switches a multiplexer 60 to receive a hardwired 5-bit code "J" and then shifts the "J" code output of multiplexer 60 into a FIFO buffer 62. Controller 34 then switches multiplexer 60 to select a hardwired "K" code and shifts the "K" code output of multiplexer 60 into FIFO buffer 62. (As explained below, the J-K code sequence marks the beginning of a data packet transmission on output line V0.) Thereafter, controller 34 switches multiplexer 60 to select the 5-bit data output of an encoder circuit 58 which converts the 4-bit data appearing on data input/output bus 61 of RAM 36 to 5-bit "4B5B" encoded form (described below). Controller 34 then begins sequentially reading 4-bit nibbles of the data packet out of RAM 36. As encoder 58 converts the nibbles to 5-bit 4B5B encoded form, multiplexer 60 passes the 5-bit result to a FIFO buffer 62. Controller 34 strobes a shift in (SI) signal causing FIFO buffer 62 to load the 5-bit data values. FIFO buffer 62 produces a FULL signal telling controller 34 when the buffer is full. The longest stored nibble in FIFO buffer 62 is delivered to a shift register 56. When FIFO buffer 62 is not empty, state machine 50 signals shift register 56 to shift in the 5-bit value from buffer 65, and then signals it to shift it out in serial form onto switch input line V0 to switch 12 of FIG. 1. Switch 12 routes the data to the appropriate output port.

As buffer controller 34 forwards the packet data out of RAM 36 to FIFO buffer 62 it counts the nibbles sent and compares the count to the known length of the packet stored in the packet header. After it forwards the last nibble of the packet through encoder 58 to FIFO buffer 62, controller 34 switches multiplexer 60 to select and forward to FIFO buffer 62 a 5-bit hardwired "T" code. This T code, which marks the end of the packet, passes through in FIFO buffer 62 and shift register 56 and travels outward on line V0 at the end of the data packet. When the last bit of nibble of a packet departs FIFO buffer 62, buffer 62 signals state machine 50 that it is empty. State machine 50 then initiates another connection request if FIFO buffer 45 is not empty, and waits for another GRANTED signal pulse indicating that a next connection request has been established. It then signals controller 34 with a NEXT_PACKET signal pulse indicating that it may forward the next packet stored in RAM 36.

4B5B Encoding

Data packets are encoded before being transmitted on output line V0 to enable the output ports to determine when the data packets begin and end. Consistent with the ANSI standard X379(FDDI) "4B5B" encoding system, encoder 54 converts each incoming 4-bit nibble into a 5-bit output value as illustrated in Table II.

TABLE II

| NIBBLE | 4B5B |
|--------|-------|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

Since only 16 of the 32 possible combinations of the five bits of a 4B5B code are needed to represent the sixteen possible values of a 4-bit nibble, the remaining 16 combinations of 4B5B code are available for other purposes. Table III below lists how the network switch of the present invention uses the remaining 16 4B5B codes.

TABLE III

| 4B5B | NAME | FUNCTION |
|-------|------|----------|
| 00000 | Q | No Operation |
| 11111 | I | Idle |
| 00100 | H | No Operation |
| 11000 | J | Packet Start 1 |
| 10001 | K | Packet Start 2 |
| 01101 | T | End of Packet |
| 00111 | R | No Operation |
| 11001 | S | No Operation |
| 00001 | V | Violation |
| 00011 | V | Violation |
| 00010 | V | Violation |
| 00101 | V | Violation |
| 00110 | V | Violation |
| 01000 | V | Violation |
| 01100 | V | Violation |
| 10000 | CR | Con. Req. Start |

The Q, H, R and S codes are ignored when they appear in a 4B5B encoded data stream. The T code indicates the end of a 4B5B encoded data packet. The I, J, K and V codes are used to synchronize transmission and receipt of 4B5B encoded data streams in the manner described below.

Output Port

Figure 3:
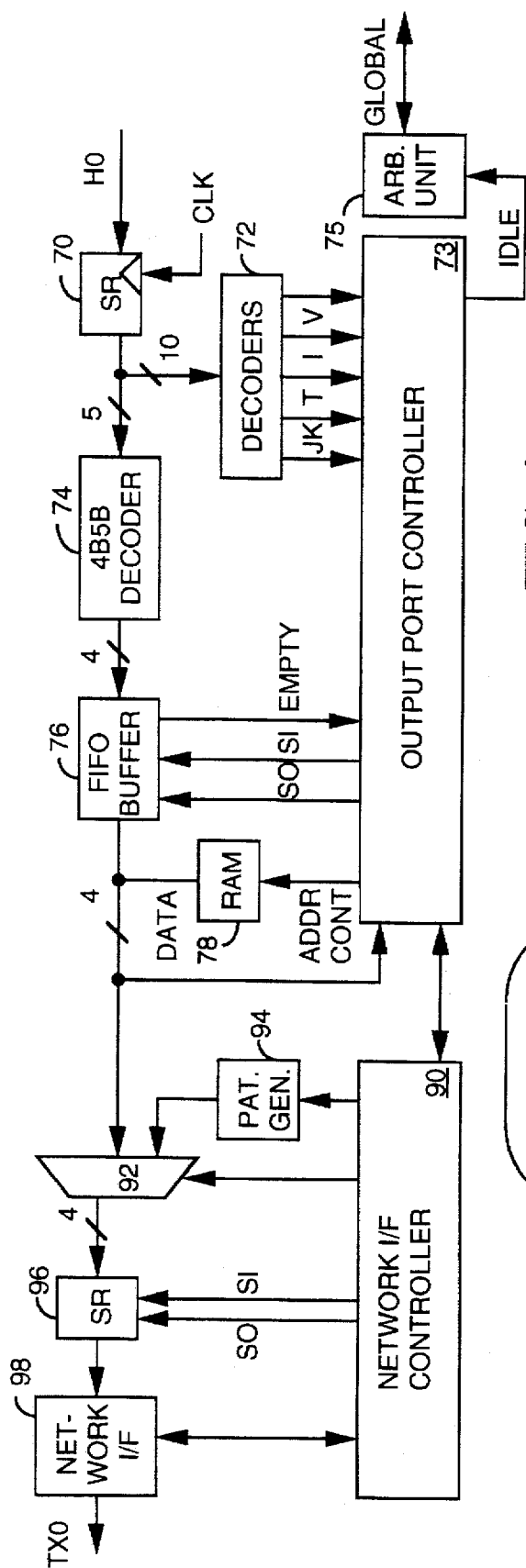
FIG. 3 illustrates a typical output port of FIG. 2 in more detailed block diagram form.

FIG. 3 illustrates output port TP0 of FIG. 1 in more detailed block diagram form. Output ports TP1–TP23 are similar. Output port TP0 includes a 10-bit serial-in, parallel-out shift register 70 clocked by the system clock signal CLK for receiving and storing data bits arriving on the H0 line. A set of decoders 72 signal an output port controller 73 when the five data bits stored longest in shift register 70 represent the I,V, or T codes of Table II above or when all ten bits in shift register 70 represent the J and K codes in succession. A 4B5B decoder 74 converts the longest stored 5-bit value into the corresponding 4-bit nibble and passes it to the input of a FIFO buffer 76.

Figure 4:
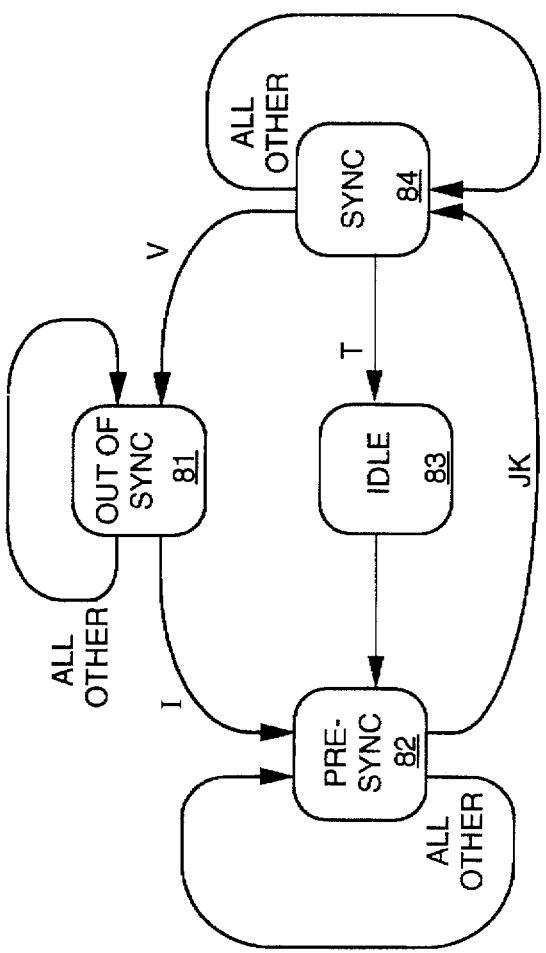
FIG. 4 is a state diagram illustrating an operation of the output port controller of FIG. 3.

FIG. 4 is state diagram illustrating a synchronization process carried out by input controller 73 of FIG. 4. Input controller 73 begins in an "out-of-synchronization" state 81. Controller 73 remains in state 81 until decoders 72 detect the I (idle) signal. At that point controller 73 moves to a "presynchronization" state 82. When decoders 72 signal detection of successive J and K symbols (indicating start of a data packet) controller 74 waits 10 cycles of the CLK signal to clear the J and K symbols from shift register 70 and then switches to a SYNC state 84 wherein it asserts an SI signal on every 5th pulse of the system clock signal to load each nibble of the incoming packet into FIFO buffer 76. If decoders 72 detect the T code indicating end of packet, controller 73 shifts to a state 83 where it pulses an IDLE signal supplied to an arbitration unit 75 and then returns to state 84. If decoders 72 detect the V code controller 73 reverts to the out-of-synchronization state 81.

Referring again to FIG. 3, when FIFO buffer 76 signals it is not empty, controller 73 shifts data out of FIFO buffer 76 onto a 4-bit data input/output bus of a random access memory (RAM) 78. Controller 73 then supplies address and control signals to RAM 78 causing it to store the 4-bit nibble. Controller 73 uses RAM 78 as a FIFO buffer for assembling and storing successively received data packets until they can be transmitted outward to the destination station. Controller 73 reads the length field in the packet header as it arrives in RAM 78 to determine the length of the packet and counts of packet bytes received and stored in RAM 78 to determine when the packet is fully assembled in RAM 78. When the packet is fully loaded into RAM 78 controller 73 signals a network interface controller 90.

Controller 90 controls transmission of data packets outward to the destination station on bus TX0. When controller 90 is ready to forward a packet stored in RAM 78 it switches a multiplexer 92 to select the output of a pattern generator 94 and signals generator 94 to produce a sequence of 4-bit nibbles forming standard Ethernet protocol PREAMBLE and START data packet fields. Multiplexer 92 passes each nibble to a parallel-in/serial-out shift register 96 controlled by controller 90. Shift register 96 passes the data in serial form to a conventional Ethernet interface circuit 98 which forwards the data outward on the TX0 bus to the destination network station. After the PREAMBLE and START fields have been forwarded through multiplexer 92, controller 90 signals controller 73 to begin sequentially reading 4-bit packet data out of RAM 78 and passing them through multiplexer 92 and shift register 96 to interface circuit 98 for transmission to the destination station. When controller 73 has read out the last nibble of a packet, it signals controller 90.

An arbitration unit 75 communicates with the arbitration controller 22 of FIG. 1 via the GLOBAL bus. Arbitration unit 75 receives an IDLE signal pulse when decoders 72 detect the "T" code indicating receipt of the end of a packet. As described in more detail below, when arbitration unit 75 is later polled by arbitration controller 22 of FIG. 1, it signals the arbitration controller that output port TP0 has become idle and is no longer receiving a packet on line H0.

Hierarchical Address Translation System

Figure 5:
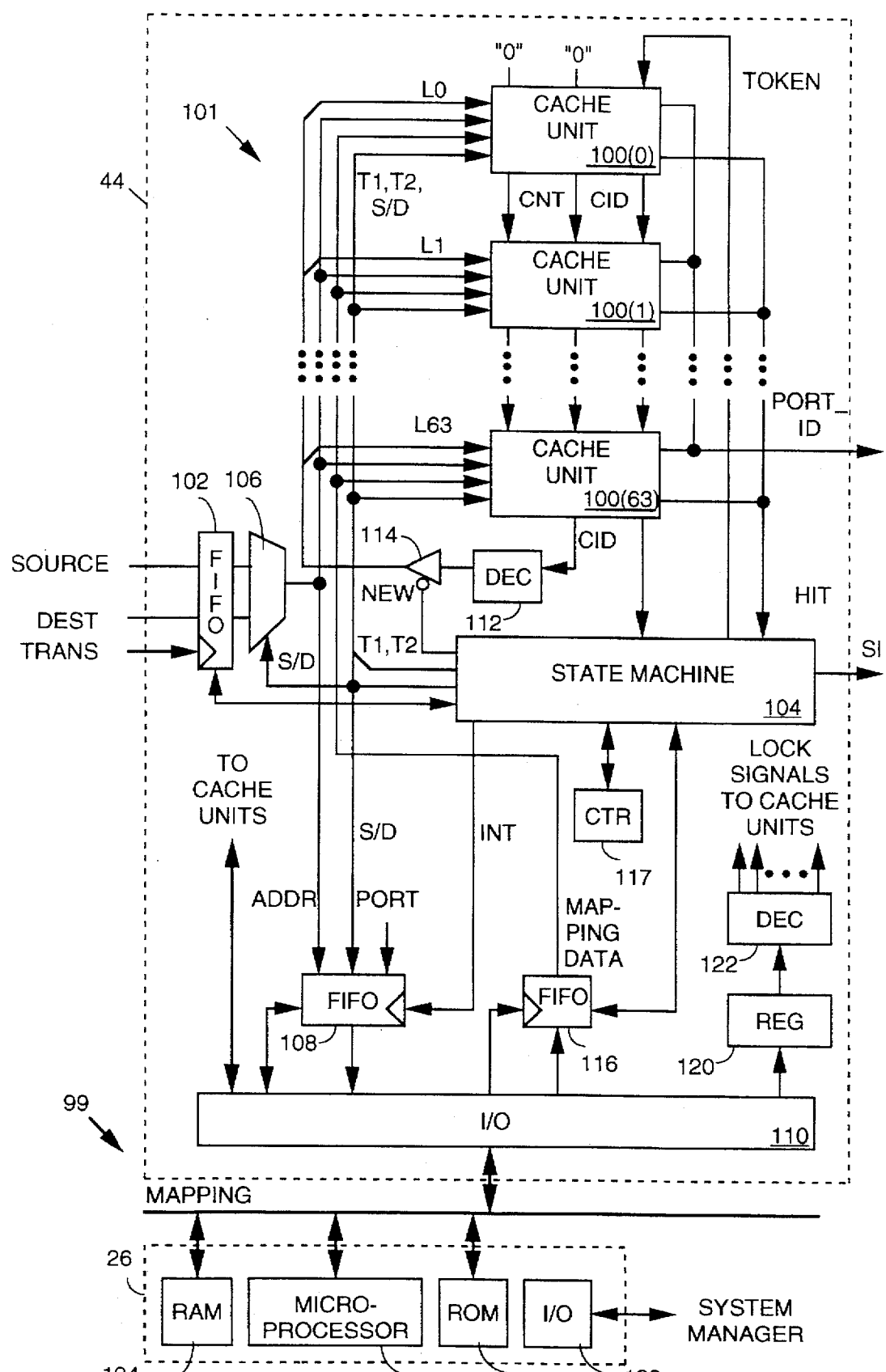
FIG. 5 illustrates in block diagram form the hierarchical address translation system in accordance with the present invention.

Referring to FIG. 5 the local translation unit 44 of each input port forms a part of a hierarchical address translation system 99 for mapping 6-byte network station addresses to 5-bit IDs of the switch ports to which the stations are connected. The hierarchical address translation system 99 includes a central translation unit 26 having a memory for storing a mapping entry for each network station, the entry mapping the station's network address to its switch port. The system also includes the local translation unit 44 in each input port connected to the central translation unit through a common bus (MAPPING). For simplicity only one address translation unit 44 is shown in FIG. 3 but there are actually 23 other such translation units connected to the MAPPING bus, one for each input port RP1–RP23 of FIG. 1.

Each local translation unit 44 includes a local cache memory 101 (formed by a set of cache units 100) for storing a smaller subset of the mapping entries stored by the central translation unit 26. When incoming packet's destination address is supplied to translation unit 44, it looks for a cache memory entry mapping the destination address to an output port. Upon finding such an entry in its cache memory, the local translation unit 44 places the output port ID on the PORT_ID lines to FIFO buffer 45 of FIG. 2 and pulses an output SI line to shift the port ID in to the FIFO buffer. When translation unit 44 does not find an entry in its cache memory mapping the incoming destination address, it obtains a copy of the appropriate mapping entry from central translation unit 26 via the GLOBAL bus and stores the copy as a new mapping entry in its cache memory 101. The new mapping entry replaces a least recently used existing entry. The local translation unit 44 then places the output port ID on the PORT_ID lines to FIFO buffer 45 of FIG. 2 and pulses its output SI line to shift the port ID in to the FIFO buffer.

Since a network station is typically more likely to send a next data transmission to one of the network stations to which it most recently transmitted data, the local translation unit 44 will often find an appropriate mapping entry in its local cache unit and will not often need to obtain mapping data from the central translation unit. The hierarchical address translation system of the present invention significantly reduces competition for access to the central address translation unit 26 and therefore improves system throughput, particularly during times of heavy network traffic.

Mapping Entry Creation

Input and output ports serving the same network station have the same port ID. As mentioned above, each incoming data packet also includes a SOURCE field conveying the network address of the station that sent the packet. Translation unit 44 uses some of its cache memory space for storing most recently received SOURCE addresses. When it receives an incoming SOURCE address not currently in its cache memory, translation unit 44 replaces a least used entry with the incoming SOURCE address. The translation unit 44 also sends the new SOURCE address and its own input port's ID to the central address translation unit 26 via the MAPPING bus. The central address translation unit 26 creates a mapping entry relating the SOURCE address to accompanying port ID. Thereafter the switch will route all incoming packets directed to that network address to the output port identified by the new mapping entry. For example, whenever a new network station logs onto the network or changes its network address, it may send a packet to itself in order to establish a mapping entry for itself. Upon receiving an incoming SOURCE address currently stored in its cache memory, translation unit 44 does not forward the SOURCE address to the central translation unit 26 since presence of the SOURCE address in the local cache memory indicates that central translation unit 26 has already created a mapping entry. It should be noted that more than one network station may be served by a given input/output port pair. Thus the local cache memory within each local translation unit 44 may include more than one SOURCE address entry.

Local Address Translation Unit

The cache memory 101 of local address translation unit 44 of FIG. 2 includes a set of 64 cache units 100(0)-100(63). Each cache unit 100 holds one mapping entry including data listed in Table IV below:

TABLE IV

| FIELD | DESCRIPTION | SIZE |
| --- | --- | --- |
| ADDRESS | Network Address | 6 bytes |
| V | Valid | 1 bit |
| S/D | Source/Destination | 1 bit |
| PORT | Port ID | 5 bits |

The ADDRESS field is the 6 byte SOURCE or DEST address of a network station. The V bit indicates whether the entry is valid. On system startup the V bit in each entry is set to a logical "0" to indicate the entry is invalid. As valid data is loaded into a cache unit, it V bit is set to a "1". The S/D bit indicates whether the entry was created for a source or destination network address. When the cache unit contains a destination address in the ADDRESS field, the 5-bit port field contains the ID of the output port to which the station identified by the ADDRESS field is connected. The PORT field is not used when the cache unit stores a source in the ADDRESS field.

Let us first assume that no cache unit 100 contains a valid source or destination ADDRESS entry matching an incoming SOURCE or DEST address. A TRANS signal pulse from controller 34 of FIG. 2 loads the SOURCE and DEST addresses of the incoming packet into a FIFO buffer 102 within unit 44. FIFO buffer 102 signals state machine 104 that it contains SOURCE and DEST addresses. State machine 104 responds by signaling a multiplexer 106 to deliver the SOURCE address to each cache unit 100. State machine 104 also sends a T1 signal pulse to each cache unit 100.

In response to the T1 signal pulse, each cache unit 100 having a valid source entry compares the incoming SOURCE address to its stored ADDRESS field. If a cache unit 100 storing a source address notes a match between the incoming SOURCE address and its stored source address, the cache unit briefly asserts (pulls down) a HIT line input to state machine 104. A HIT line pulse tells state machine 104 that the central translation unit 26 has already mapped the source address to a port ID. Since in this case, no cache unit 100 stores a valid source address matching the incoming SOURCE address, no unit 100 pulses the HIT line.

State machine 104, having detected no HIT line pulse in response to its output T1 signal pulse, pulses an INT signal which loads the SOURCE address output of multiplexer 106 into a FIFO buffer 108. The FIFO buffer 108 also stores the ID of the input port (PORT) and an S/D bit from state machine 104 indicating that the address being loaded into FIFO buffer 108 is a source address. When not empty, FIFO buffer 108 signals a bus interface circuit 110 to send an interrupt to central translation unit 26 via the MAPPING bus. The central translation unit 26 thereafter reads the data out of FIFO buffer 108 and creates a mapping entry relating the shifted out SOURCE address and port ID.

After having loaded the SOURCE data into FIFO buffer 108 to be forward to the central translation unit 26, state machine 104 initiates a "token passing cycle" to create a new entry for the incoming SOURCE field in the least used cache unit 100. Each cache unit 100 counts the number of T1 signals pulses received and resets its own count whenever it pulses the HIT line. Thus the cache unit 100 with the highest count is the "least recently used" cache unit. The cache units 100 and state machine 104 are connected to form a "token passing ring" in which state machine 104 sends a TOKEN signal pulse to first cache unit 100(0), the Nth cache unit 100(N) passes a received TOKEN signal pulse ("passes the token") to cache unit N+1, and the last cache unit 100(63) passes the token back to state machine 104. Each cache unit 100(N) is also connected to the next cache unit 100(N+1) via a set of lines CNT conveying a count to the next cache unit. Each cache unit 100(N) has a unique ID and is also connected to the next cache unit 100(N+1) by another set of lines CID for conveying a cache unit ID to the next cache unit.

After storing the SOURCE address in FIFO buffer 108, state machine 104 passes the token (pulses its output TOKEN signal) to first cache unit 100(0). When the first cache unit 100(0) receives the token from state machine 104, it transmits its count and its ID number to the second cache unit 100(1) and then passes the token to second cache unit 100(1). When the second cache unit 100(1) receives the token from the first cache unit 100(0), it compares its own count to the incoming count from the first cache unit 100(0). If the second cache unit's count is smaller than the first cache unit's count, the second cache unit forwards the first cache unit's count and ID with the token to the third cache unit 100(3). On the other hand, if the second cache unit's count is greater than or equal to the first cache unit's count, the second cache unit forwards its own count and ID with the token to the third cache unit 100(3).

Each subsequent cache unit 100(N) behaves in a similar manner, passing the token with the count and ID received from the preceding unit to a next unit 100(N+1) when the count received from unit 100(N−1) is larger than its own, and passing the token to the next unit 100(N+1) with its own count and ID when the count received from unit 100(N−1) is smaller than or equal to its own. The last cache unit 100(63) delivers the ID of the cache unit having the largest count (i.e. containing the least recently used mapping entry) to a decoder 112 and passes the token back to state machine 104.

Decoder 112 has 64 outputs L0-L63, each coupled to a corresponding one of cache units 100(0)-100(63) through a set of tristate buffers 114. Decoder 112 asserts one of its outputs L0-L63 corresponding to the cache unit identified by the cache ID (CID) output of cache unit 100(63). State machine 104 responds to the return of the token by briefly turning on buffers 114, one of which thereby delivering a pulse on the L0-L63 signal to the cache unit 100 containing the least used entry. An L0-L63 pulse tells the receiving cache unit 100 to replace its current ADDRESS field with the current SOURCE address output of multiplexer 106, to set its V field to indicate the entry is valid, and to set its S/D field to indicate the entry is a source address.

The new SOURCE entry having thus replaced the least recently used entry of one of cache units 100, sequencer 106 switches multiplexer 106 to pass the DEST field stored in FIFO buffer 102 to the cache units 100 and pulses a T2 signal supplied to all cache units to initiate a destination address translation cycle. Any cache unit 100 storing a destination address field matching the DEST address pulses the HIT line. Since, in this case, no cache unit 100 contains a valid destination address matching the incoming DEST address, no cache unit 100 pulses the HIT line. State machine 104, detecting HIT line response to its T2 signal pulse, knows that cache units 100 can't translate the DEST field. At this point, state machine 104 again pulses the INT signal, this time causing FIFO buffer 108 to store the DEST address output of multiplexer 106 in FIFO buffer 108 along with the input port ID and the S/D bit from sequencer 104 indicating a destination address translation is requested. State machine 104 also sends a pulse to a counter 117 which keeps track of the number of pending DEST address translations. The pulse tells counter 117 to increase its count by 1. State machine 104, having sent the DEST address to the central translation unit 26 now sends a shift out pulse to FIFO buffer 102 to signal FIFO buffer 102 to supply a next stored SOURCE/DEST address pair, if any, to multiplexer 106. State machine 104 then starts a new address translation cycle. If FIFO buffer 102 is empty, state machine 104 waits until new data arrives in FIFO buffer 102 before initiating another address translation cycle.

When the central translation unit 26 thereafter reads the data out of FIFO buffer 108, it translates the DEST field into a corresponding output port ID and then sends the DEST field, the S/D bit and the output port ID back to bus interface circuit 110 via the MAPPING bus. Interface circuit 110 stores the returned data in another FIFO buffer 116. FIFO buffer 116 thereafter signals state machine 104 that it is not empty. State machine 104 responds by again passing the token to the first cache unit 100(0). The cache units 100 thereafter operate as described herein above to deliver a cash unit ID (CID) to decoder 112, the ID identifying the cache unit containing the least recently used mapping entry. When the token returns to state machine 104, state machine 104 again momentarily turns on buffers 114 to pulse one of line L0-L63. This causes the cache unit 100 containing the least recently used mapping entry to replace it with the mapping data stored in FIFO buffer 116. That cache unit also passes the newly stored output port ID to the PORT_ID line and pulls down the HIT line. State machine 104 then pulses the SI line to shift PORT_ID into FIFO buffer 45 of FIG. 2, sends an SO signal to FIFO buffer 116 to shift the old mapping data out of FIFO buffer 116, and signals counter 117 to reduce its pending DEST address translation count by one.

We assume now that one cache unit 100 already contains an entry storing an ADDRESS field matching the SOURCE address of the incoming packet and that another cache unit 100 already contains a valid entry mapping the DEST address to an output port. In response to the TRANS pulse, state machine 104 sends a T1 signal pulse to each cache unit 100. In response to the T1 signal pulse, the particular cache unit 100 currently storing an ADDRESS field matching the incoming SOURCE address immediately pulses the HIT line. The HIT line pulse tells state machine 104 that the SOURCE address is already mapped by one of the cache units 100 (and by the central translation unit 26) and that no further action is required with respect to the incoming SOURCE address.

State machine 104 then switches multiplexer 106 to send its DEST address input to all cache units 100 sends a T2 signal pulse to all cache units 100. The cache unit 100 storing a valid ADDRESS field matching the incoming DEST address places its stored PORT field on the PORT_ID lines and pulses the HIT line. State machine 104 responds to the HIT line pulse by checking an output signal of counter 117 asserted when the number of pending address translations is greater than 0.

Translation unit 44 must produce output port ID's on the PORT_ID lines in the same order as it is presented with corresponding DEST addresses. Therefore state machine 104 delays sending out a port ID provided by one of cache units 100 in response to the current incoming DEST field until all pending DEST translations have been processed and the resulting port IDs forwarded to FIFO buffer 45 of FIG. 2. If the output signal of counter 117 indicates that there are no pending DEST address translations, state machine 104 responds to the HIT signal by pulsing the SI line to shift the port ID currently on the PORT_ID lines into FIFO buffer 45 of FIG. 2. It then shifts the old SOURCE/DEST data out of FIFO buffer 102 and awaits arrival of another SOURCE/DEST address pair in FIFO buffer 102.

However, if the output signal of counter 117 indicates that there are pending DEST address translations, state machine 104 does not pulse the SI after a cache unit 100 places a destination port ID on the PORT_ID lines and pulses the HIT signal. Instead, state machine 104 turns off its T2 signal output and continues to process the pending DEST address translations as they arrive in FIFO buffer 116 by storing mapping entries in cache memory and sending the arriving destination port IDs outward on the PORT_ID lines. When the output of counter 117 indicates that all pending DEST address translations have been processed, with multiplexer 106 still passing the DEST address to the cache units 100, state machine 104 again pulses the T2 signal. If the cache unit 100 still maps the DEST address to a port ID, it again places the port ID on the PORT_ID lines and asserts the HIT signal. State machine 104 responds by pulsing the SI line to shift the port ID on the PORT_ID lines into FIFO buffer 45 of FIG. 2, shifting the last processed SOURCE and DEST address out of FIFO buffer 106, and initiating a new translation process if FIFO buffer 102 is not empty. If a cache unit 100 no longer maps the incoming DEST address to a port ID, the hit line is not asserted and state machine 104 instead sends the DEST address to the central translation unit 26 in the manner described herein above.

Locking

A system manager accessing central translation unit 26 via an I/O port 129 may command the central translation unit 26 to directly write mapping entries into each cache unit 100. The system manager can also request the central translation unit to write data to a lock register 120. A decoder 122 decodes the data in lock register 120 to produce a separate LOCK signal input to each cache unit 100. A LOCK signal tells the receiving cache unit 100 that it is not to replace its stored translation data even the cache unit may be storing the least recently used entry. Thus when the LOCK signal input to any cache unit 100 is asserted during a token passing cycle, that cache unit passes the count and ID of the preceding cache unit rather than its own, even if its own count is larger. Thus a system manager can write translation data in one or more cache units and then lock the data into those cache units so that it may not thereafter replaced even when it is the least recently used translation data.

Central Translation Unit

Central translation unit 26 employs conventional microcomputer architecture including a random access memory 124 storing mapping entries, a microprocessor 126 for executing program instructions stored in ROM 128 and an I/O port 129 for providing an input path for data from the system manager. A main program routine executed by microprocessor 126 simply writes data from the system manager into lock registers 120 or to registers within cache units 100 at register addresses supplied by the system manager. Microprocessor 126 handles address translation and mapping entry update using an interrupt routine described herein below.

Cache Unit

Figure 6:
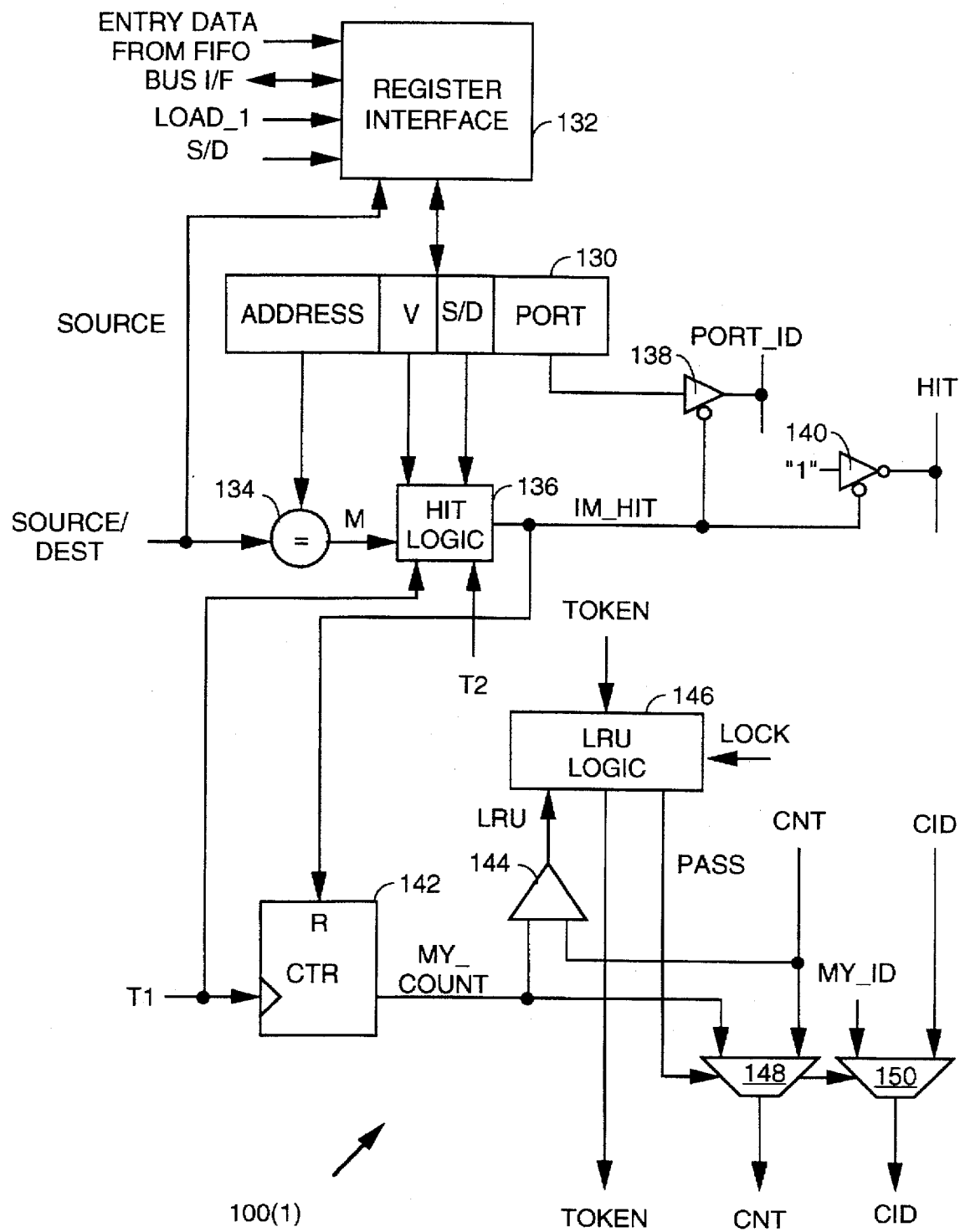
FIG. 6 illustrates in block diagram form a typical address cache unit of the local address translation unit of FIG. 1, FIG. 7-10 are flow charts illustrating operation of the state machine of FIG. 5.

FIG. 6 illustrates a cache unit 100(1) of FIG. 5 in more detailed block diagram form. The other cache units 100 are similar. Cache unit 100(1) includes a register 130 for storing the mapping entry. A conventional interface circuit 132 communicates with bus interface circuit 110 (FIG. 5), and allows the bus interface circuit to directly write access register 130. Register interface circuit 132 also receives the returned DEST address and port ID from FIFO buffer 116 (FIG. 5) and stores them in register 130 in response to the LOAD_1 signal from buffer 114 (FIG. 5) when the S/D bit is sent to indicate a destination address mapping entry is to be saved. Register interface circuit 132 also receives the SOURCE address from multiplexer 106 (FIG. 5) and stores it in register 130 in response to a pulse of the LOAD_1 signal when the S/D signal from state machine 104 (FIG. 5) indicates the SOURCE address is to be saved. On system startup register interface circuit sets a valid bit V in register 130 to a logical "0" indicating that the entry is not valid. Thereafter, when valid data is loaded into register 130, interface circuit 132 sets the V bit to a logical "1". Also when interface circuit 132 writes a SOURCE or DEST entry into register field it sets the S/D bit to a "0" or a "1" to indicate whether register contains a SOURCE or DEST address.

A comparator 134 asserts an output signal M whenever the ADDRESS field in register 130 matches an incoming SOURCE or DEST address from multiplexer 106 of FIG. 5. The M signal, the T1 and T2 signal pulses from state machine 104 (FIG. 5), and the V and S/D bits in register 130 are all supplied to a logic circuit 136. Logic circuit 136 produces an output signal IM_HIT in accordance with truth TABLE V.

TABLE V

| V | S/D | T1 | T2 | M | IM_HIT |
|---|-----|----|----|---|--------|
| 1 | 0   | 1  | 0  | 1 | 1      |
| 1 | 1   | 0  | 1  | 1 | 1      |
| 0 | X   | X  | X  | X | 0      |
| X | X   | X  | X  | 0 | 0      |

In the above table a "1" indicates the signal is asserted, a "0" indicates the signal is not asserted and an "X" indicates the signal may be either asserted or not asserted. When IM_HIT is a logical "1" it turns on a pair of tristate buffers 138 and 140. Buffer 138 places the PORT ID in register 130 on the PORT_ID lines. Buffer 140 pulls down (asserts) the HIT line.

Cache unit 100 also includes a counter 142 incremented on each pulse of the T1 signal and reset on each pulse of the IM_HIT signal. Counter 142 keeps track of the number of times the ADDRESS stored in register 130 fails to match either the incoming SOURCE or DEST field and produces an output count MY_COUNT. When MY_COUNT reaches the counter's upper limit, the count remains at the upper limit until reset. A comparator 144 compares MY_COUNT to the incoming count CNT from the preceding cache unit and produces an output signal LRU when CNT is less than or equal to MY_COUNT. The input TOKEN signal, the LRU signal and the LOCK signal (from decoder 122 FIG. 5) provide inputs to another logic circuit 146. Logic circuit 146 produces an output signal PASS controlling a pair of multiplexers 148 and 150. Multiplexer 148 supplies the count data to the next cache unit on the CNT lines by selecting either the count data on the CNT lines from the preceding cache unit or the MY_COUNT out of counter 142. Multiplexer 150 passes a cache unit ID on the CID lines to the next cache unit by selecting either the ID on the CID lines from the preceding cache unit or its own hardwired ID (MY_ID). When logic circuit 146 asserts PASS, multiplexers 148 and 150 pass MY_COUNT and MY_ID. Table VI indicates the logic performed by logic circuit 146.

TABLE VI

| TOKEN (IN) | LOCK | LRU | TOKEN (OUT) | PASS |
|------------|------|-----|-------------|------|
| 0          | X    | X   | 0           | 0    |
| 1          | 0    | 1   | 1           | 1    |
| 1          | 0    | 0   | 1           | 0    |
| 1          | 1    | X   | 1           | 0    |

The LRU logic circuit 146 suitably delays pulsing its output TOKEN signal so that it does not pass the token before multiplexers 148 and 150 have had time to switch in response to a change of state of the PASS signal.

Local Translation Unit State Machine Logic

Figure 7:
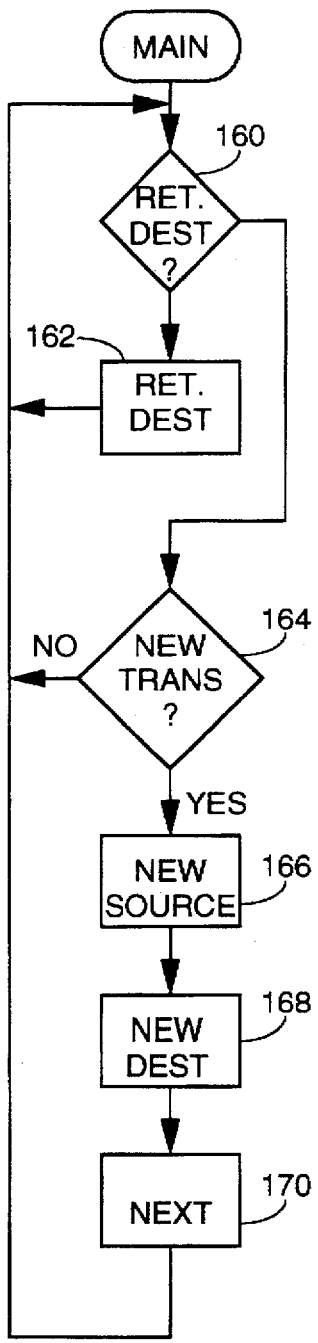

FIG. 7 is a flow chart illustrating a main routine executed by state machine 104 of FIG. 5. Referring to FIGS. 5 and 7, beginning at step 160, state machine 104 checks FIFO buffer 116 to see if it contains DEST address mapping data returned from the central translation unit 26. If FIFO buffer 116 contains returned destination mapping data, state machine 104 updates the address translation cache by writing the destination data from FIFO buffer 116 into one of cache units 100 and sending the returned port ID out on the PORT_ID line (step 162). (Step 162 is detailed herein below). State machine 104 cycles through steps 160/162 until at step 160 it finds FIFO buffer 116 is empty. It then checks FIFO buffer 102 to determine if it contains new translation data (step 164). If not, state machine 104 returns to step 160. If FIFO buffer 102 is not empty, state machine 104 processes the new SOURCE address in FIFO buffer 102 (step 166) and then processes the new DEST address in FIFO buffer 102 (step 168). (Steps 166 and 168 are detailed herein below.) After processing the new SOURCE and DEST addresses, state machine 102 transmits a NEXT signal to FIFO buffer 102 to shift out the last processed SOURCE and DEST addresses (step 170) and then returns to step 160.

Figure 8:
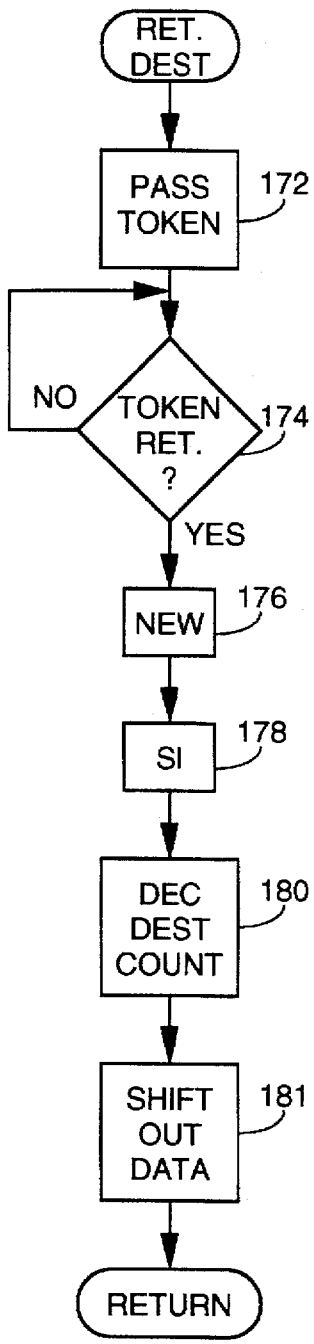

FIG. 8 illustrates the RETURNED DEST subroutine executed at step 162 of FIG. 7 when state machine 104 detects that FIFO buffer 116 stores destination mapping data returned by the central address translation unit. Referring to FIGS. 5 and 8, state machine 104 initially passes the token to cache unit 100(0) (step 172) and then waits unit cache unit 100(63) returns the token (step 174). It then transmits a NEW signal pulse to buffers 114 to write the destination address translation data in FIFO buffer 116 into the least recently used cache unit 100 (step 176). The cache unit 100 receiving the data places the port ID on the PORT_ID lines. State machine 104 pulses the SI signal to write the port ID into buffer 45 of FIG. 2 (step 178). State machine 104 then sends a signal pulse to counter 117 telling it to decrement its count by 1 (step 180) and sends a signal pulse to FIFO buffer 116 telling it to shift out the last processed destination address translation data. The subroutine then returns to its calling routine.

Figure 9:
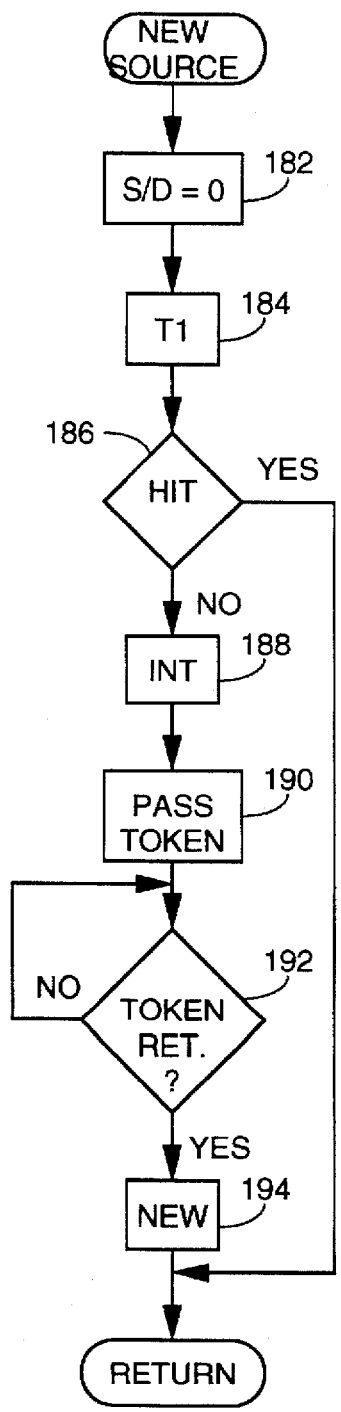

FIG. 9 illustrates the NEW SOURCE subroutine called at step 166 of the main routine of FIG. 7. Referring to FIGS. 5 and 9, state machine 104 initially sets the S/D bit to "0" to cause multiplexer 106 to select the current SOURCE address output of FIFO buffer 102 (step 182) and asserts the T1 signal (step 184). If one of the cache units 100 contains an entry matching the incoming SOURCE address, it asserts the HIT line. If state machine 104 detects the HIT line assertion (step 186) the subroutine ends. However if no cache unit 100 contains an entry matching the SOURCE address, state machine pulses the INT signal (step 188) to send the SOURCE address mapping data into FIFO buffer 108 to be forwarded to the central translation unit 26. State machine 190 then passes the token to cache unit 100(0) (step 190) and waits until the token returns (step 192). At that point it sends a NEW signal pulse to buffers 114 causing the cache unit 100 storing the least recently used entry to store the new SOURCE address (step 194). The routine then returns to the main routine.

Figures 10, 11:
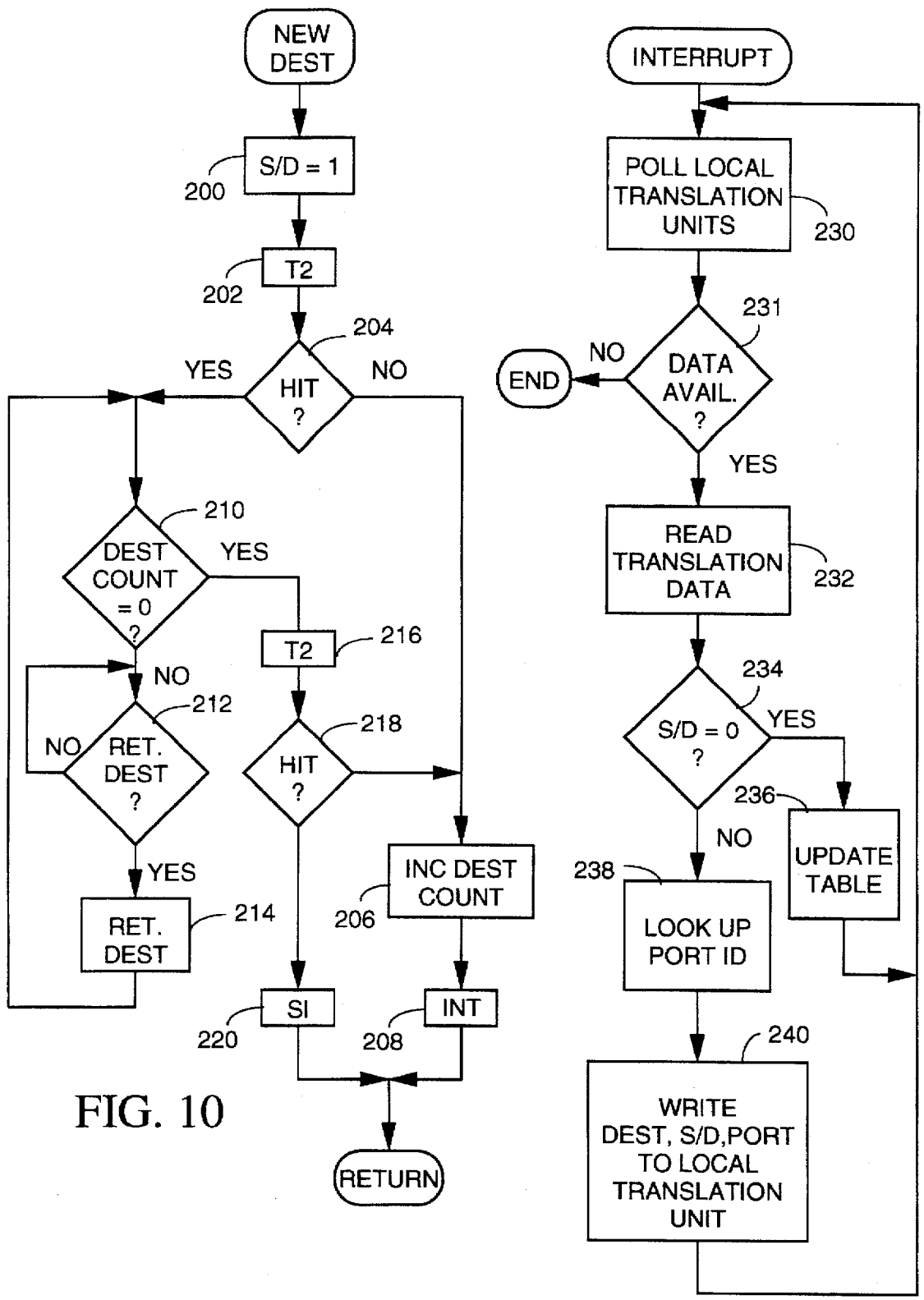
FIG. 11 is a flow chart illustrating an interrupt routine executed by the central translation unit of FIG. 5.

FIG. 10 illustrates the NEW DEST subroutine called at step 168 of the main routine of FIG. 7. Referring to FIGS. 5 and 10, state machine 104 initially sets the S/D bit to a "1" causing multiplexer 106 to pass the DEST address output of FIFO buffer 102 to the cache units 100 (step 200). State machine 104 then pulses the T2 signal (step 202) and checks the HIT line (step 204). If none of the cache units asserts the HIT line, state machine 104 signals counter 117 to increase its count by one (step 206) and pulses the INT signal to load the DEST address translation data into FIFO buffer 108 to be forwarded to the central translation unit 26. The subroutine then returns to the main routine. However if one of the cache units asserts the HIT line at step 204, state machine 104 checks the output of counter 117 (step 210). State machine 104 then waits until an output signal of FIFO buffer 116 indicates the central translation unit has returned destination address translation data (step 212). At that point state machine 104 executes the RETURNED DEST subroutine of FIG. 8 to write the translation data output of FIFO buffer 116 into the least recently used cache unit 100 (step 214). State machine 104 continues to cycle through steps 210, 212 and 214 until the count maintained by counter 117 reaches zero, indicating that all pending destination address translations have been written into the cache units 100. At that point, state machine 104 pulses the T2 signal (step 216) and checks the HIT line again (step 218). If one of the cache units still contains an entry matching the incoming DEST address from multiplexer 106, the cache unit places the port ID on the PORT_ID lines and asserts the HIT line. The HIT line assertion tells state machine 104 to pulse the SI signal to shift the port ID into buffer 45 of FIG. 2 (step 220). If the cache unit 100 previously mapping the incoming DEST address no longer does so, the HIT line will not be asserted at step 218. Instead state machine 104 executes steps 206 and 208 to send the DEST field to central translation unit 26. The subroutine then returns to the main routine.

FIG. 11 is a flow chart illustrating an interrupt routine executed by the central address translation unit 26 of FIG. 5 in response to an interrupt signal from any local translation unit 44 via the GLOBAL bus. Referring to FIGS. 5 and 11, central translation unit 26 initially polls the local translation units (step 230) to locate a translation unit 44 having a non-empty FIFO buffer 108. When a data is found in a FIFO buffer 108 (step 231), the central translation unit reads and shifts the translation data out of the FIFO buffer (step 232) and checks the S/D bit in the data (step 234). If the S/D bit is a logical "0", then the data conveys a SOURCE address and a corresponding port ID. In that case, the central translation unit 26 adds a mapping entry to its address translation table (step 236) to map the source address to its accompanying port ID. If the S/D bit is a logical "1" (step 234), the data acquired from the FIFO buffer 108 conveys a destination address and the central translation unit 26 looks up the corresponding output port ID in the appropriate mapping entry (step 238) and shifts the destination address, the S/D bit, and the port ID into FIFO buffer 116 of the local translation unit 44 from which the destination address was obtained (step 240). Thereafter, or after updating the mapping entry at step 236, the interrupt routine returns to step 230 to again poll the local address translation units to determine if any more data is stored in the FIFO buffer 108 of any local translation unit 44. The interrupt routine continues to read and process such data until all FIFO buffers 108 are empty. At that point (step 231) the interrupt routine ends.

Arbitration System

Figure 12:
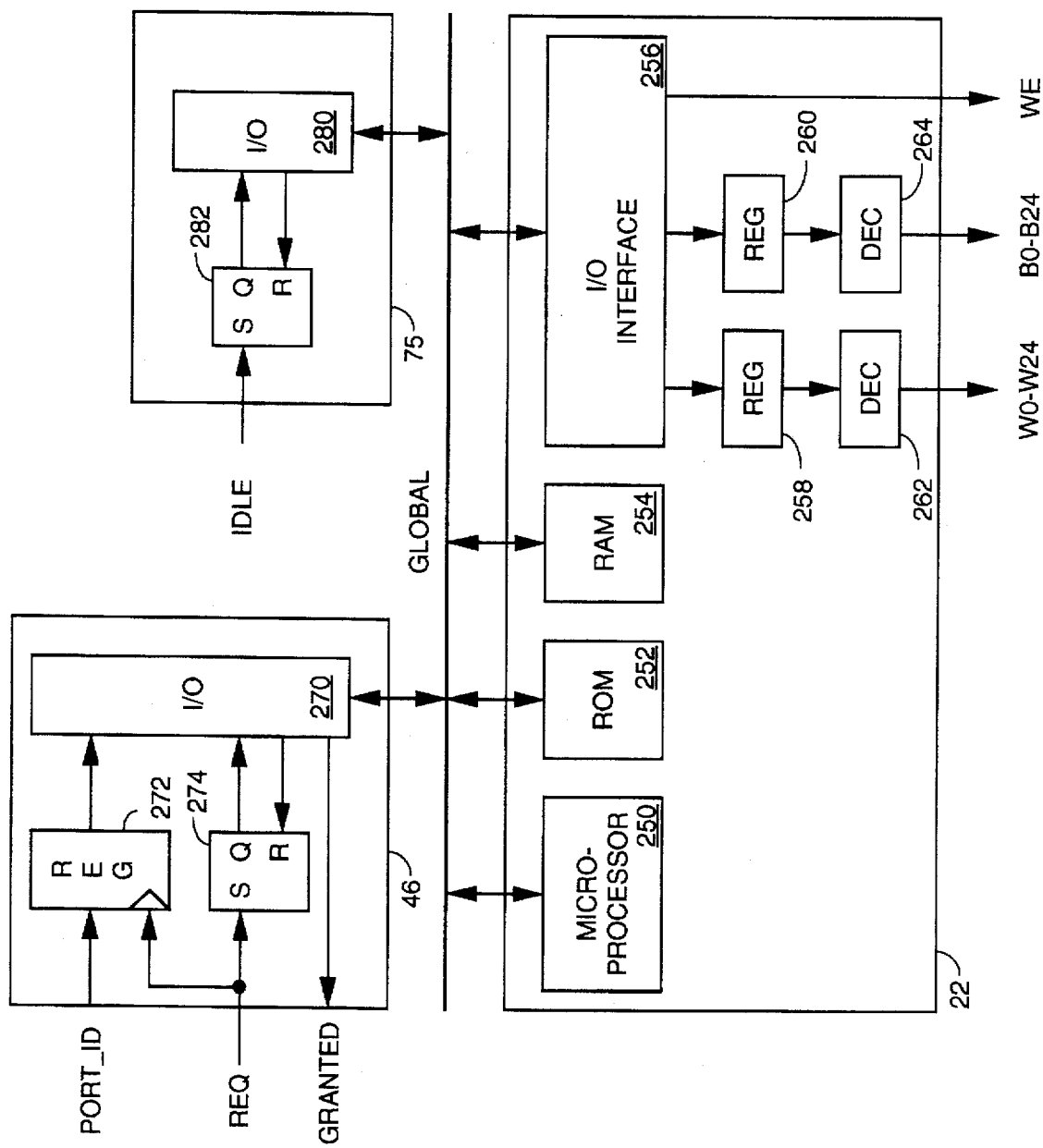
FIG. 12 is a block diagram of an arbitration system employed by the network switch of FIG. 1.

FIG. 12 illustrates in more detailed block diagram form, the arbitration controller 22 (FIG. 1), an input port arbitration unit 46 (FIG. 2) and an output port arbitration unit 75 (FIG. 3), all interconnected by the GLOBAL bus. Although only one input port arbitration unit 46 and one output port translation unit 75 are shown, there are actually 24 of each type connected in parallel to the GLOBAL bus.

Sequencer 22 includes a microprocessor 250 operating under control of firmware stored in a ROM 252 and using a RAM 254 for temporary data storage. Microprocessor 250, ROM 252, RAM 254, and I/O interface circuit 256 and all input and output ports are linked by the GLOBAL bus. Sequencer 22 maintains two tables in RAM 254. One table lists pending requests from the input ports RP0–RP23, indicating the input and output ports to be connected. The other table indicates which of output ports TP0–TP23 are currently idle. Sequencer 22 periodically polls the input port arbitration units 44 to determine if any input port have a new connection request and polls the output port arbitration units 110 to determine which output ports are now idle.

The input port arbitration unit 46 includes a bus interface circuit 270, a register 272 and a flip-flop 274. When state machine 50 (FIG. 2) transmits a REQ signal pulse to arbitration unit 46 to signal that it has a new connection request, the REQ signal loads the ID (PORT_ID) of the requested port into register 272 and sets flip-flop 274. Later, when arbitration controller 22 polls arbitration unit 46, it checks the Q output of flip-flop 274 to determine if a new request is pending and then resets the flip-flop. If a new request is pending, microprocessor 250 acquires the ID of the requested output port (PORT_ID) from register 272. Microprocessor 250 then checks the list of idle output ports in RAM 254 to determine if the requested output port is idle. If the requested port is not idle, microprocessor 250 adds the request to the pending request table. If the requested output port is idle, microprocessor 250 updates the idle port table to indicate that the requested output port is no longer idle, and sends the request output port ID to a register 258 and the requesting input port ID to a register 260 via interface circuit 256.

A decoder 262 within controller 22 decodes the output port ID in register 258 and asserts one of the W0–W23 lines to RAM 14 of FIG. 1. A decoder 264 decodes the input port ID in register 260 to assert one of bit lines B0–B23 and deassert the remaining bit lines. Thereafter microprocessor 250 signals interface circuit 250 to pulse the write enable line WE to RAM 14 of FIG. 1. RAM 14 stores the B0–B23 data word at the memory location indicated by the asserted W0–W23 bit, causing crosspoint switch 12 of FIG. 1 to make the connection between the requesting input port and the requested output port and to break any previous connection to the output port. Thereafter microprocessor 250 signals the bus interface circuit 270 of the requesting input port that the request has been granted. Interface circuit 270 then pulses the GRANTED signal to the input port's state machine 90 (FIG. 2).

The output port arbitration unit 75 includes a bus interface circuit 280 and a flip-flop 282. When controller 73 of FIG. 3 pulses the IDLE signal to signal the end of a unicast packet arriving on the H0 line, the IDLE signal pulse sets flip-flop 282. Thereafter, when the arbitration controller 22 polls the output port, it checks the Q output of flip-flop 282 to determine if the port is newly idle and then resets the flop-flop. When microprocessor 250 receives an indication that an output port TP0–TP23 has become idle, it checks the pending request list to determine if any input port has a pending request for the newly idle output port. If so it grants the request by sending the input port and requested output port IDs to registers 258 and 260, and telling interface circuit 256 to pulse the write enable signal WE. The microprocessor 250 then sends a GRANTED message to the requesting input port via the global bus. If there are no pending requests for the newly idle output port, microprocessor 250 simple updates the idle port list to indicate the output port or is now idle.

Thus has been described a local area network switch having a hierarchical address translation unit including a central translation unit for mapping all network addresses to switch output ports and a local translation unit in each switch input port maintaining a cache of a relatively few of the most recently used address translation. Since a network station is typically more likely to send a next data transmission to one of a relatively few network stations to which it most recently sent data, the local address cache in each input port significantly reduces competition for access to the central address translation unit. Thus the network switch of the present invention quickly routes data transmissions between network stations with minimal address translation delay.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for routine data transmissions between uniquely addressed network stations, each data transmission including an address of the station to which the transmission is being sent the network switch comprising:

a plurality of input ports, each receiving data transmissions from a separate one of said network stations, and for generating routing requests;

a plurality of output ports, each forwarding data transmissions to a corresponding one of said network stations;

routing means for selectively routing data transmissions from said input ports to said output ports in accordance with routing requests generated by said input ports; and a central translation unit for storing a plurality of mapping entries, each mapping entry corresponding to a separate network station and mapping the address of the corresponding network station to an output port to which the station is connected;

wherein each input port includes a cache memory for storing copies of a portion of said mapping entries stored in said central address translation unlit, wherein upon receiving a data transmission from a network station, any one of said input ports already storing in its cache memory an entry mapping an address conveyed in the data transmission to an output port transmits a routing request to said routing means causing said routing means to route the data transmission from the input port to the output part mapped by the cache memory entry.

wherein upon receiving a data transmission from a network station, any one of said input ports not already having in its cache memory an entry mapping an address conveyed in the data transmission to an output port obtains such mapping entry from said central translation unit, stores the obtained mapping entry in its cache memory, and transmits a routing request to said routing means causing said routing means to route the data transmission to the output port mapped the obtained mapping entry, wherein each output port has associated therewith a unique port ID and each mapping entry includes a network address and a corresponding port ID.

wherein said cache memory comprises a plurality of cache units, each cache unit storing a separate mapping entry, each cache unit receiving an address included in each data transmission received by the input port and providing its stored port ID as a cache memory output when the received address matches the cache unit's stored address and wherein the input port generates the routing request transmitted to said routing means in accordance with the port ID output of the cache memory, wherein each input port further comprises means for receiving input LOCK data from an external source, the LOCK data identifying at least one of said cache unit mapping entries as being locked, and wherein the input port stores the obtained mapping entry into a one of the cache units not identified by said input lock data as being locked.

2. The network switch in accordance with claim 1 wherein the an input port stores an obtained mapping entry into a particular one of the cache units not identified as being locked which maps a network address least recently received by the cache units not identified as being locked.

3. A network switch for routing data transmissions between uniquely addressed network stations, each data transmission including an address of the station to which the transmission is being sent, the network switch comprising:

a plurality of input ports, each receiving data transmissions from a separate one of said network stations, and for generating routing requests;

a plurality of output ports each forwarding data transmissions to a corresponding one of said network stations;

routing means for selectively routing data transmissions from said input ports to said output ports in accordance with routing requests generated by said input ports; and a central translation unit for storing a plurality of mapping entries, each mapping entry corresponding to a separate network station and mapping the address of the corresponding network station to an output port to which the station is connected;

wherein each input port includes a cache memory for storing copies of a portion of said mapping entries stored in said central address translation unit, wherein upon receiving a data transmission from a network station, any one of said input ports already storing in its cache memory an entry mapping an address conveyed in the data transmission to an output port transmits a routing request to said routing means causing said routing means to route the data transmission from the input port to the output port mapped by the cache memory entry, wherein upon receiving a data transmission from a network station, any one of said input ports not already having in its cache memory an entry mapping an address conveyed in the data transmission to an output port obtains such mapping entry from said central translation unit, stores the obtained mapping entry in its cache memory, and transmits a routing request to said routing means causing said routing means to route the data transmission to the output port mapped by the obtained mapping entry, wherein each output port has associated therewith a unique port ID and each mapping entry includes a network address and a corresponding port ID, wherein said cache memory comprises a plurality of cache units, each cache unit storing a separate mapping entry, each cache unit receiving an address included in each data transmission received by the input port and providing its stored port ID as a cache memory output when the received address matches the cache unit's stored address, wherein the input port generates the routing request transmitted to said routing means in accordance with the port ID output of the cache memory, wherein when an input port stores an obtained mapping entry into a particular one of the cache units mapping a network address least recently received by the cache units, wherein each cache unit maintains a miss count of a number of consecutive times it receives an address included in a data transmission which does not match its mapped address and resets its count when it receives an address matching its mapped address, and wherein said input port stores the obtained mapping entry in the cache unit having a highest miss count, wherein each cache unit has a unique cache unit ID, wherein each of said cache units are interconnected in series so that each cache unit other than a first cache unit of said series receives as input a miss count and a cache unit ID output from a preceding cache unit of said series, wherein each cache unit provides as output its own miss count and cache unit ID when its own miss count is less than its received miss count and provides its received miss count and cache unit ID as output when its own miss count exceeds its received miss count, and wherein said input port stores the obtained mapping entry in the cache unit identified by the cache unit ID output of a last cache unit of said series.

4. A network switch for routing data transmissions between uniquely addressed network stations, each data transmission including an address of the station to which the transmission is being sent, the network switch comprising:

a plurality of input ports each receiving data transmissions from a separate one of said network stations, and for generating routing requests;

a plurality of output sorts, each forwarding data transmissions to a corresponding one of said network stations;

routing means for selectively routing data transmissions from said input ports to said output ports in accordance with routing requests generated by said input ports; and a central translation unit for storing a plurality of mapping entries, each mapping entry corresponding to a separate network station and mapping the address of the corresponding network station to an output port to which the station is connected;

wherein each input port includes a cache memory for storing copies of a portion of said mapping entries stored in said central address translation unit, wherein upon receiving a data transmission from a network station, any one of said input ports already storing in its cache memory an entry mapping an address conveyed in the data transmission to an output port transmits a routing request to said routing means causing said routing means to route the data transmission from the input port to the output port mapped by the cache memory entry, wherein upon receiving a data transmission from a network station, any one of said input ports not already having in its cache memory an entry mapping an address conveyed in the data transmission to an output port obtains such mapping entry from said central translation unit, stores the obtained mapping entry in its cache memory, and transmits a routing request to said routing means causing said routing means to route the data transmission to the output port mapped by the obtained mapping entry, wherein each output port has associated therewith a unique port ID and each mapping entry includes a network address and a corresponding port ID, wherein said cache memory comprises a plurality of cache units, each cache unit storing a separate mapping entry, each cache unit receiving an address included in each data transmission received by the input port and providing its stored port ID as a cache memory output when the received address matches the cache unit's stored address, wherein the input port generates the routing request transmitted to said routing means in accordance with the port ID output of the cache memory, wherein when an input port stores an obtained mapping entry into a particular one of the cache units mapping a network address least recently received by the cache unit, wherein each cache unit maintains a miss count of a number of consecutive times it receives an address included in a data transmission which does not match its mapped address and resets its count when it receives an address matching its mapped address, and wherein said input port stores the obtained mapping entry in the cache unit having a highest miss count, wherein each cache unit includes an input for receiving an externally generated LOCK signal, wherein each cache unit has a unique cache unit ID;

wherein each of said cache units are interconnected in series so that each cache unit other than a first cache unit of said series receives as input a miss count and a cache unit ID output from a preceding cache unit of said series, wherein each cache unit provides as output its own miss count and cache unit ID when its own miss count is less than its received miss count and its input LOCK signal is not asserted, and provides its received miss count and cache unit ID as output when its own miss count exceeds its received miss count and when its LOCK signal is asserted, and wherein said input port stores the obtained mapping entry in the cache unit identified by the cache unit ID output of a last cache unit of said series.

5. A hierarchical address translation system for a network switch having a plurality of ports, each port receiving incoming source addresses from a separate source, and each port having a unique identification number (ID), for mapping incoming source address to an ID of a port receiving the incoming source address, the system comprising:

a bus;

a central translation unit connected to said bus for receiving and storing a plurality of mapping entries, each mapping entry mapping a source address to a corresponding port ID; and a plurality of local translation units, each corresponding to a separate one of said ports, each local translation unit comprising a cache memory for storing a subset of the mapping entries stored by said central translation unit and means for receiving incoming source addresses from a separate one of said sources, and upon receiving an incoming source address not already stored in a mapping entry of its cache memory transmitting the source address and an ID of the corresponding port as a mapping entry to the central translation unit via said bus for storage thereby.

6. A hierarchical translation system for receiving incoming input data values from a plurality of sources and producing an output data value corresponding to each input data value, the system comprising:

a bus for conveying data values;

a central translation unit connected to said bus for storing a plurality of mapping entries, each mapping entry mapping an input data value to a corresponding output data value, and for transmitting an output data value on said bus in response to an input data value received via said bus; and a plurality of local translation units, each local translation unit comprising a cache memory for storing a subset of the mapping entries stored by said central translation unit and means for receiving incoming input data values from a separate one of said sources, and upon receiving an incoming input data value already stored in a mapping entry of its cache memory providing an output data value stored in that mapping entry as system output, and upon receiving an incoming input data value not already stored in a mapping entry of its cache memory transmitting the input data value to the central translation unit via said bus, receiving a corresponding data value from the central translation unit via said bus, storing the incoming input data value and received output data value as a new mapping entry in its cache memory, and providing the received output data value as system output, wherein said cache memory comprises a plurality of cache units, each cache unit storing one of said mapping entries, each cache unit receiving the incoming input data value and providing its stored output data value as a system output when the incoming data value matches the cache unit's stored input data value, wherein when one of said local translation units stores a new mapping entry in its cache memory, it replaces an existing mapping entry stored in a particular one of the cache units replacing an existing mapping entry in one of the cache units containing an input data value having least recently matched an incoming input data value, wherein each cache unit maintains a miss count of a number of consecutive times it receives an incoming input data value which does not match its stored input data value and resets its count when it receives an incoming input data value matching its stored input data value, and wherein each local translation unit stores the new mapping entry in one of its cache units having a highest miss count, wherein each cache unit has a unique cache unit ID;

wherein the cache units of each local translation unit are interconnected in series whereby each cache unit other than a first cache unit of said series receives as input a miss count and a cache unit ID output from a preceding cache unit of said series, wherein each cache unit provides as output its own miss count and cache unit ID when its own miss count is less than its received miss count and provides as output its received miss count and cache unit ID when its own miss count exceeds its received miss count, and wherein each local translation unit stores the new mapping entry in the cache unit identified by the cache unit ID output of a last cache unit of said series.

7. A hierarchical translation system for receiving incoming input data values from a plurality of sources and producing an output data value corresponding to each input data value, the system comprising:

a bus for conveying data values;

a central translation unit connected to said bus for storing a plurality of mapping entries, each mapping entry mapping an input data value to a corresponding output data value, and for transmitting an output data value on said bus in response to an input data value received via said bus; and a plurality of local translation units, each local translation unit comprising a cache memory for storing a subset of the mapping entries stored by said central translation unit and means for receiving incoming input data values from a separate one of said sources, and upon receiving an incoming input data value already stored in a mapping entry of its cache memory providing an output data value stored in that mapping entry as system output, and upon receiving an incoming input data value not already stored in a mapping entry of its cache memory transmitting the input data value to the central translation unit via said bus, receiving a corresponding data value from the central translation unit via said bus, storing the incoming input data value and received output data value as a new mapping entry in its cache memory, and providing the received output data value as system output, wherein said cache memory comprises a plurality of cache units, each cache unit storing one of said mapping entries, each cache unit receiving the incoming input data value and providing its stored output data value as a system output when the incoming data value matches the cache unit's stored input data value, wherein when one of said local translation units stores a new mapping entry in its cache memory, it replaces an existing mapping entry stored in a particular one of the cache units replacing an existing mapping entry in one of the cache units containing an input data value having least recently matched an incoming input data value, wherein each cache unit maintains a miss count of a number of consecutive times it receives an incoming input data value which does not match its stored input data value and resets its count when it receives an incoming input data value matching its stored input data value, and wherein each local translation unit stores the new mapping entry in one of its cache units having a highest miss count, wherein each cache unit includes an input for receiving an externally generated LOCK signal, wherein each cache unit of each local translation unit has a unique cache unit ID;

wherein the cache units of each local translation unit are interconnected in series so that each cache unit other than a first cache unit of said series receives as input a miss count and a cache unit ID output from a preceding cache unit of said series, wherein each cache unit provides as output its own miss count and cache unit ID when its own miss count is less than its received miss count and its input LOCK signal is not asserted, and provides its received miss count and cache unit ID as output when its own miss count exceeds its received miss count and when its LOCK signal is asserted, and wherein each local translation unit stores the new mapping entry in the cache unit identified by the cache unit ID output of a last cache unit of said series.

* * * * *

UNITED STATES PATENT AND TRADEMARK OFFICE
CERTIFICATE OF CORRECTION

PATENT NO. : 5,754,791
DATED : May 19, 1998
INVENTOR(S) : Kent Blair DAHLGREN and Daniel J. BEDELL It is certified that error appears in the above-identified patent and that said Letters Patent is hereby corrected as shown below:

```
Column 17, line 41 (claim 1, line 1), "routine" should be
deleted and replaced with --routing--.

Column 18, line 12 (claim 1, line 38), after "mapped"
should be inserted --by--.

Column 19, line 58 (claim 4, line 8), "sorts" should
be deleted and replaced with --ports--.

Column 20, line 39 (claim 4, line 55), "unit" should
be deleted and replaced with --units--.
```

Column 17, line 62,(claim 1, line 21)," unlit" should be deleted and replaced with --unit --.

Signed and Sealed this

Eighteenth Day of August, 1998

Attest:

BRUCE LEHMAN

*Attesting Officer*　　　　*Commissioner of Patents and Trademarks*